2,995,578
BENZONAPHTHOFURANDIONES SUBSTITUTED IN THE NAPHTHO RING
Mario Francesco Sartori, Wilmington, Del., assignor to E. I. du Pont de Nemours and Company, Wilmington, Del., a corporation of Delaware
No Drawing. Filed Mar. 31, 1958, Ser. No. 724,812
5 Claims. (Cl. 260—346.2)

This invention relates to novel organic compounds which are useful as dyes and intermediates. More particularly, this invention deals with novel organic compounds of the formula

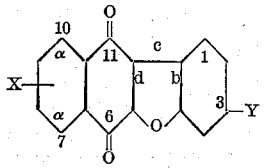

wherein X represents a substituent of the group consisting of nitro, amino, chloro and bromo, located in one of the α-positions, while Y designates a member of the group consisting of H, OH and $OCH_3$.

I have found that the compounds of the above formula are yellow to red crystalline materials, which are useful as disperse dyes for polyester fiber such as polyethylene terephthalate fiber or acid-modified polyester fibers. By the latter term I mean polyethylene terephthalate fiber containing metal sulfonate groups, as described more fully in Belgian Patent No. 549,179, granted July 14, 1957, to E. I. du Pont de Nemours and Company, on the application of J. M. Griffing and W. R. Remington.

The dyeings on said fibers with the chloro, bromo and amino compounds of the above general formula are characterized particulaly by yielding bright, strong dyeings of good light-fastness and good sublimation fastness. The nitro and halogeno compounds are further useful as intermediates for the production of the amino compound. In addition, all the above compounds are useful as intermediates for the preparation of anthraquinone-carbazole type vat dyes, by known processes.

More particularly, the compounds of the above formula wherein X is $NH_2$ may be condensed in known manner with an α-halogeno anthraquinone, for instance 1-chloro-anthraquinone, or 1-benzamido-4-, 5- or 8-chloro-anthraquinone, to give the corresponding anthrimide, which in turn may be ring-closed in known manner to the corresponding carbazole type compound. The compounds wherein X is $NO_2$, Cl or Br, on the other hand, may be converted into the same anthrimides by reacting in known manner with an α-amino-anthraquinone, such as 1-amino anthraquinone or 1-benzamido-4-, 5- or 8-amino-anthraquinone; the subsequent ring-closure then follows in the same manner as above, to give the same or analogous vat dyes.

The novel compounds of this invention may be prepared by several methods, which include direct synthesis from compounds of simpler formulas as well as transformation of a member of the group X, of the general formula above, into a different member of the same group.

These various methods are fully illustrated by the various examples which follow, it being understood, however, that these examples are not intended to limit this invention. Parts mentioned are by weight.

*Example 1.*—X=$NO_2$; *by direct synthesis*

2,3-dichloro-5-nitro-1,4-naphthoquinone (5.4 parts) was added to a solution of 3-methoxyphenol (3 parts) in pyridine (25 parts). A dark red suspension was formed and the temperature rose to 40° C. The mixture was then heated to 100° C. in about 1 hour and agitated at this temperature for an additional 3 hours. After stirring 12 hours at room temperature the orange precipitate was collected and washed with ethanol. This crude, after repeated extractions with hot water, gave 5 parts of an orange powder.

The absorption maximum of a solution of the orange powder in o-dichlorobenzene is located at 450 millimicrons. This product is a mixture of 7- and 10-nitro-3-methoxybenzonaphthofuran-6,11-diones of the formula

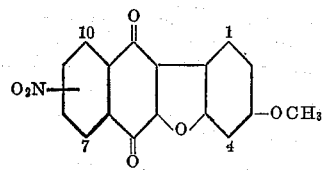

*Analysis.*—Calculated for $C_{17}H_9O_6N$: C, 63.2; H, 2.8; N, 4.3. Found: C, 63.6; H, 2.9; N, 4.5.

When the 3-methoxyphenol in this example is replaced by an equivalent amount of resorcinol, one obtains a mixture of 7- and 10-nitro-3-hydroxybenzonaphthofuran-6,11-diones of the formula:

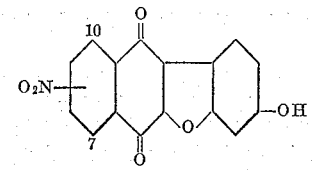

By treatment with dimethylsulfate, this hydroxy derivative gives the 3-methoxy derivative above described.

*Example 2.*—X=$NH_2$; *by direct synthesis*

A mixture of 5-amino-2,3-dichloro-1,4-naphthoquinone (2.4 parts) and 3-methoxyphenol (1.3 parts) in pyridine (8 parts) was heated at 100° C. for 3 hours. After stirring the dark brown suspension at 5°–10° C. for 12 hours, the precipitate was collected, washed first with ethyl alcohol then with hot water. After crystallization from toluene, this product gave dark red brown crystals of M.P. 266° C. The absorption spectrum of this product in o-dichlorobenzene shows two peaks, located respectively at 432 and 500 millimicrons, indicating that it is a mixture of 7- and 10-amino-3-methoxybenzo(b)naphtho[2,3-d]-furan-6,11-dione.

When the above process is repeated except for using resorcinol (1.15 parts) in lieu of 3-methoxyphenol, a mixture of 7- and 10- amino-3-hydroxybenzonaphthofuran-6,11-dione may be obtained.

*Example 3.*—X=$NH_2$; *by reduction of nitro compound*

A mixture of nitro-3-methoxybenzonaphthofuran-6,11-diones (2 parts) obtained as in Example 1, was added to a stirred solution of sodium hydrosulfite (10 parts) and 30% aqueous sodium hydroxide (40 parts) in water (300 parts). After 15 minutes at 35° C. the slurry changed to a clear solution. The agitation at 35° to 40° C. was continued for 1 hour, then the solution was filtered and the filtrate was oxidized with air. The precipitate, dried and crystallized from toluene, gave dark brown crystals of M.P. 266°–268° C. By chromatography on aluminum oxide, under standard conditions using benzene solution, two amino isomers (the 7- and 10-amino) were separated, one as dark brown crystals and the other as violet crystals. The absorption maxima of these two amino isomers in o-dichlorobenzene are located respectively, at 432 and 500 millimicrons.

*Analysis.*—Calculated for $C_{17}H_{11}O_4N$: C, 70.0; H, 3.7; N, 4.7. Found: C, 69.8; H, 3.8; N, 5.0.

This product dyes polyethylene terephthalate fiber and acid-modified polyester fibers bright scarlet shades of excellent fastness properties.

When the mixture of nitro-methoxybenzonapthofurandiones in this example is replaced by an equal weight of the nitro-3-hydroxybenzonaphthofurandione mixture described in Example 1, the corresponding amino derivative (mixture) is obtained.

It dyes polyester fiber red shades of good fastness properties.

*Example 4.—X=halogen; by Sandmeyer reaction from amino compound*

One part of the mixture of amines obtained in Example 3 was dissolved in 96% sulfuric acid (10 parts) and to this solution, cooled to 5°–10° C., was added portion-wise sodium nitrite (0.25 part). After stirring for 3 hours at 5°–10° C., the obtained diazo solution was slowly poured under the surface of a solution of cuprous bromide (5 parts) in 48% hydrobromic acid (50 parts). After stirring for one hour at room temperature the orange slurry was diluted with 100 parts of water, slowly heated to 90° C. and agitated at this temperature for one hour. The formed orange precipitate was filtered off, washed and crystallized from acetic acid. The absorption spectrum of this product, bromo-3-methoxy-benzo(b)naphtho [2,3-d]furan-6,11-dione, in o-dichlorobenzene shows two peaks, at 358 and 436 millimicrons.

*Bromine analyis.*—Calculated for $C_{17}H_9O_4Br$, 22.3%; found, 21.7%.

Similarly, the chloro-3-methoxybenzo(b)naphtho-[2,3-d]furan-6,11-dione is obtained when the cuprous bromide and the hydrobromic acid used in this example are substituted by equivalent amounts of cuprous chloride and hydrochloric acid.

Likewise, the bromo-3-hydroxybenzo(b)naphtho [2,3-d]-furan-6,11-dione is obtained when the amino-3-methoxybenzo-(b)naphtho[2,3-d]furan-6,11-dione in this example is substituted by an equivalent amount of amino-3-hydroxybenzo(b)naphthol[2,3-d]furan-6,11-dione.

*Example 5.—X=Cl or Br; by direct synthesis*

1.3 Parts of sodium were slowly dissolved in 60 parts of anhydrous methanol, and the solution was cooled to 15° C. To this solution were added 8.8 parts of 6-methoxybenzofuran-2,3-dione, prepared following the method described by Fries, K. in Ann. 442, 291 (1925), and after a few minutes 13.9 parts of o-bromophenacyl bromide, prepared by bromination of o-bromoacetophenone following the method described by R. E. Lutz in J. Org. Chem. 12, 666 (1947). A red solution was obtained, which turned greenish by heating to 50° C. and then again red at the boil. After 2 hours at refluxing temperature, the reaction mass was cooled to room temperature and the yellow precipitate was filtered off. After crystallization from ethanol, pale yellow crystals of M.P. 126° C. were obtained.

The reaction up to this point may be explained by the following equation:

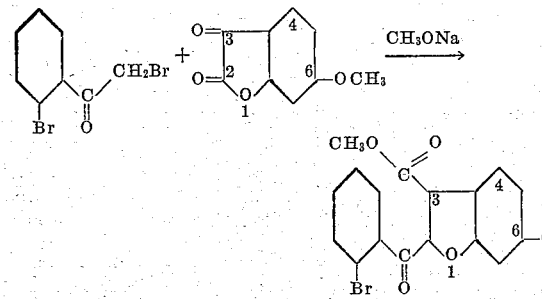

and the product thus obtained may be named: 2-(o-bromobenzoyl)-6-methoxy-3-benzofuran-carboxylic acid methyl ester.

*Analysis.*—Calculated for $C_{18}H_{13}O_5Br$: C, 56.0; H, 3.3; Br, 20.6. Found: C, 55.4; H, 3.4; Br, 19.8.

To prepare the free carboxylic acid, an alcoholic solution of the above described methyl ester (10 parts in 80 parts ethanol) was refluxed for 0.5 hours with an excess of 30% aqueous sodium hydroxide. A clear amber solution was obtained at the boil. After 30 minutes at refluxing temperature the reaction mass was concentrated to 50 parts under vacuum, cooled to room temperature, made acid with concentrated hydrochloric acid, and the precipitate was filtered off. After crystallization from acetic acid, pale yellow crystals of M.P. 181°–183° C. were obtained.

The acid chloride of the above acid (6 parts), obtained by treatment with thionyl chloride at room temperature, was dissolved in 50 parts of nitrobenzene and to the obtained solution 24 parts of aluminum chloride were gradually added at room temperature. The reaction mass turned red, then brown. After 20 hours at room temperature (or 8 hours at 48° to 52° C.), the product was drowned in an ice-hydrochloric acid mixture, and the nitrobenzene was steam distilled. The orange residue was filtered off, slurried with an excess of dilute alkali and filtered again. The crude product was purified by vatting, followed by crystallization from acetic acid. The orange crystals thus obtained melt at 280° C.

The reaction described in this paragraph constitutes a ring-closure, according to the following equation:

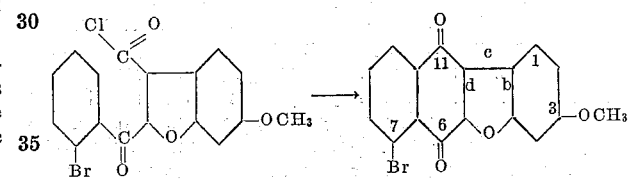

and the product may be named 7-bromo-3-methoxy-benzo(b)-naphtho[2,3-d]furan-6,11-dione. It dyes polyester fiber bright greenish yellow shades of very good nonsublimation properties.

*Analysis.*—Calculated for $C_{17}H_9O_4Br$: C, 57.2; H, 2.5; Br, 22.3. Found: C, 57.2; H, 2.6; Br, 21.2.

If the o-bromophenacyl bromide, in this example, is replaced by 11.5 parts of o-chlorophenacyl chloride, the corresponding chloro derivative, which may be named 7-chloro-3-methoxybenzo(b)naphtho[2,3-d]furan-6,11-dione, is obtained.

When the same procedure is repeated except for starting with 7.5 parts of benzofuran-2,3-dione and 13.9 parts of o-bromophenacyl bromide, the product obtained at the end is 7-bromobenzo(b)naphtho[2,3-d]furan-6,11-dione. Again, if o-chlorophenacyl chloride or o-chlorophenacyl bromide is used, in the repeated procedure, in lieu of o-bromophenacyl bromide, 7-chlorobenzo(b)naphtho [2,3-d]furan-6,11-dione is obtained.

It will be noted that the synthesis illustrated in this example leads to a product which is a single isomer.

*Example 6.—X=NH₂; by replacement of halogen in product of Example 5*

A mixture of 7-bromo-3-methoxybenzo(b)naphtho-[2,3-d]furan-6-11-dione (0.35 part), obtained as described in Example 5, p-toluenesulfonamide (0.22 part), sodium carbonate (0.16 part), cuprous chloride (0.02 part) and nitrobenzene (10 parts) is heated at 180° to 200° C. for 4 hours to yield bright orange crystals of 3-methoxy-6,11-dioxobenzo(b)naphtho[2,3-d]furan-7-p-toluenesulfonamide (M.P. 257°–259° C.). By hydrolysis of this product with 96% sulfuric acid at 10° to 15° C. for 3 hours, drowning into ice, isolation of the crude amine, and crystallization from toluene, violet crystals of 7-amino-3-methoxybenzo(b)-naphtho[2,3-d]furan-6,11-dione (M.P. 276° C.) are obtained.

This amino derivative dyes polyester fiber in bright red shades of excellent fastness properties.

If the above procedure is repeated all the way through except for starting with 0.35 part of 7-bromo-benzo(b)-naphtho[2,3-d]furan-6,11-dione, prepared as described in the last paragraph of Example 5, red crystals of 7-aminobenzo(b)naphtho[2,3-d]furan-6,11-dione are obtained, which likewise dye polyester fiber in red shades of excellent fastness properties.

It will be noted that the products of this example consist of a single isomer each, the $NH_2$ being located in position 7, whereas the amino compounds obtained in Examples 2 and 3 are mixtures of two isomers. This springs from the fact that in the condensation typified by the equation

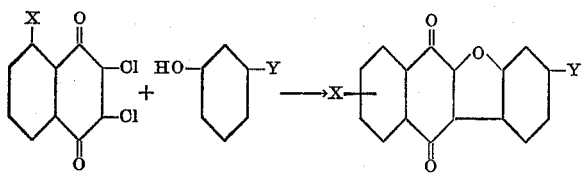

either one of the chlorine atoms has a more or less equal chance of reacting with the phenolic compound at a given point. The mixed products, however, may be separated into their isomers in known manner, for instance, by fractional crystallization from a solvent or by chromatographic methods.

It will be understood that the details of the above examples may be varied widely within the skill of those engaged in this art.

I claim as my invention:
1. A compound of the formula

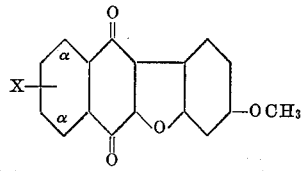

wherein X represents a substituent of the group consisting of nitro, amino, chloro and bromo, located in one of the α-positions, said compound being characterized by being applicable as a disperse dye to polyester fiber and dyeing said fiber in a yellow to red shade, of good light- and sublimation-fastness.

2. 7 - amino-3-methoxybenzo(b)naphtho[2,3-d]furan-6,11-dione.
3. 10 - amino - 3 - methoxybenzo(b)naphtho[2,3-d) furan-6,11-dione.
4. 7 - chloro - 3 - methoxybenzo(b)naphtho[2,3-d] furan-6,11-dione.
5. 7 - bromo - 3 - methoxybenzo(b)naphtho[2,3-d]-furan-6,11-dione.

References Cited in the file of this patent
UNITED STATES PATENTS
2,068,197    Schuster _____ Jan. 19, 1937

OTHER REFERENCES

Kostanecki et al.: Chemische Berichte, vol. 41 (1908), pages 2375–7.

Eistert: Chemische Berichte, vol. 80 (1947), pages 47–53.